United States Patent [19]

Elmore et al.

[11] Patent Number: 4,689,371

[45] Date of Patent: Aug. 25, 1987

[54] PROCESS FOR THE PREPARATION OF POLY (VINYLPHENOL) FROM POLY (ACETOXYSTYRENE)

[75] Inventors: Jimmy D. Elmore; Raphael J. Schweri, both of Louisville, Ky.

[73] Assignee: Celanese Corporation, New York, N.Y.

[21] Appl. No.: 882,870

[22] Filed: Jul. 7, 1986

[51] Int. Cl.$^4$ ............................................. C08F 8/12
[52] U.S. Cl. ................................ 525/374; 525/329.5; 525/374
[58] Field of Search ............................ 525/374, 379

[56] References Cited

U.S. PATENT DOCUMENTS

| | | | |
|---|---|---|---|
| 2,276,138 | 3/1945 | Alderman et al. | 525/329.5 |
| 3,547,858 | 12/1970 | Warrall | 525/329.5 |
| 3,963,862 | 6/1976 | Fujiwara et al. | 525/162 |
| 3,970,534 | 7/1976 | Fujiwara et al. | 525/298 |
| 4,129,617 | 12/1978 | Machi et al. | 525/298 |
| 4,544,704 | 10/1985 | Hefner, Jr. | 525/298 |

Primary Examiner—Paul R. Michl
Assistant Examiner—Bernard Lipman
Attorney, Agent, or Firm—H. P. Price

[57] ABSTRACT

Polymers of 4-acetoxystyrene are hydrolyzed by methanolysis with quaternary ammonium hydroxides to poly-p-vinylphenol. Such polymers are useful in photoresists and in the manufacture of metal treatment compositions.

8 Claims, No Drawings

PROCESS FOR THE PREPARATION OF POLY (VINYLPHENOL) FROM POLY (ACETOXYSTYRENE)

BACKGROUND OF INVENTION

The field of art to which this invention pertains is homopolymers and copolymers of vinylphenol.

Homopolymers and copolymers of 4-hydroxystyrene, or p-vinylphenol as it is also called, are known compositions which have many uses, such as in the manufacture of metal treatment compositions and photoresists. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerizes to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produced p-vinylphenol polymers.

Corson et. al., Journal of Organic Chemistry, 23, 544–549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethyl carbinol which is then dehydrated to p-acetoxystyrene. The p-acetoxystyrene is saponified to p-vinylphenol using potassium hydroxide.

The ester interchange reaction of poly 4-acetoxystyrene in methanol using sodium methylate is described in U.S. Pat. No. 2,276,138. About 84 percent of the acetate groups are removed by the interchange reaction. Packham, in the Journal of the Chemical Society, 1964, 2617–2624, describes the hydrolysis of crosslinked poly-4-hydroxystyrene by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshady et. al., Journal of Polymer Science, 12, 2017–2025 (1974), hydrolyzed copolymers of styrene and acetoxystyrene to the vinylphenol polymer using hydrazine hydrate in dioxane.

The hydrolysis or methanolysis of polymers of 4-acetoxystyrene is very difficult to carry to 90 percent or above completion. Also, it is extremely difficult to remove all traces of alkali metal salts which can be detrimental for some applications and uses of the vinylphenol polymer.

SUMMARY OF INVENTION

This invention pertains to a process for hydrolyzing polymers of 4-acetoxystyrene to polymers of 4-vinylphenol. More specifically, the invention relates to a methanolysis process using quaternary ammonium hydroxides as the methanolysis catalyst. Even more specifically, the invention pertains to a process for hydrolyzing polymers of 4-acetoxystyrene to polymers of 4-vinylphenol using quaternary bases as methanolysis catalysts and removing the quaternary ammonium bases by decomposing them with heat.

By the process of this invention, polymers of 4-acetoxystyrene are dissolved in methanol and are hydrolyzed to polymers of 4-vinylphenol by heating at about 50° C. to about 80° C. in the presence of a quaternary ammonium base for a time sufficient to hydrolyze at least 90 percent of the acetoxy group to phenolic groups. When the hydrolysis is complete, the methyl acetate formed in the reaction and the quaternary ammonium base in the form of its decomposition products are removed by heating at about 50° C. to about 150° C. The 4-vinylphenol polymer is recovered as a methanol solution or can be recovered neat.

DETAILED DESCRIPTION OF INVENTION

Polymers useful in this invention are homo and copolymers of 4-acetoxystyrene. 4-acetoxystyrene can be polymerized in solution, suspension, emulsion, or bulk using well known free radical catalysts, such as, for example, the peroxide and the azo compounds. 4-acetoxystyrene will homopolymerize readily in the same manner that styrene homopolymerizes and can also be copolymerized with styrene and with monomers which are copolymerizable with styrene. Examples of comonomers, in addition to styrene, are vinyl toluene, alpha-methyl styrene, the diene monomers, such as butadiene, the acrylate and methacrylate ester monomers such as methyl acrylate, methyl methacrylate, ethyl acrylate, butyl acrylate, butyl methacrylate and 2-ethylhexyl acrylate. Additional monomers include the polymerizable acids, such as acrylic acid, methacrylic acid, maleic anhydride and maleic acid, fumaric acid and the like. The preferred comonomer is styrene.

Useful copolymers contain about 1 to about 99 parts of 4-acetoxystyrene to about 1 to about 99 parts of monomer copolymerizable therewith. Preferred copolymers contain about 25 to about 75 parts of 4-acetoxystyrene to about 75 to about 25 parts of monomer copolymerizable therewith.

To carry out the process in this invention, the 4-acetoxystyrene polymer is dissolved in a solvent which is miscible with water in the amount of about at least 10 weight percent water in the solvent. Preferred solvents are those which are completely miscible with water. Examples of useful solvents are methanol, ethanol, isopropanol, butanols, and glycols such as ethylene glycol, propylene glycol, diethylene glycol, dipropylene glycol, and the like. Additional solvents include the ethers of the glycols such as ethylene glycol monomethyl ether, ethylene glycol monoethyl ether, ethylene glycol monopropyl ether, ethylene glycol monobutyl ether, diethylene glycol monomethyl ether, and the like. Mixtures of water miscible solvents and water immiscible solvents can also be used. Examples of water immiscible solvents are toluene and xylene. Regardless of which solvents are used, the solution must contain at least about 4 equivalents of methanol per equivalent of acetoxy group in order to conduct the process of this invention. The solution of polymer used in this invention will contain about 25 to about 75 weight percent polymer and preferably about 40 to about 60 weight percent.

The quaternary ammonium hydroxides useful in this invention have the following formula:

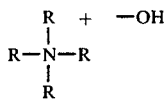

wherein each R is an organic radical which contains 1 to 8 carbon atoms. R can be aliphatic or aromatic and can be the same or different. Also included as an organic radical is hydroxyethyl. Examples of the organic radicals are methyl, ethyl, isopropyl, butyl, benzyl, methylbenzyl, and dimethylbenzyl. Examples of useful quaternary ammonium hydroxides are tetramethylammonium hydroxide, ethyltrimethylammonium hydroxide, diethyldimethylammonium hydroxide, triethylmethylammonium hydroxide, tetraethylammonium hydroxide, benzyltrimethylammonium hydroxide and choline. A preferred quaternary ammonium hydroxide is tetramethylammonium hydroxide.

The quaternary ammonium hydroxides are used in this invention in the amount of about 0.05 to about 1 mole of the quaternary ammonium hydroxide per mole of acetoxystyrene in the polymer. The preferred amount of quaternary ammonium hydroxide is about 0.1 to about 0.2 mole per mole of acetoxystyrene in the polymer.

In carrying out the process of this invention, the 4-acetoxystyrene polymer is dissolved in a solvent which contains at least about 4 moles of methanol per mole of acetoxy group. The quaternary ammonium hydroxide is added and the reaction is conducted at a temperature of about 50° C. to about 80° C. for a time sufficient to hydrolyze the acetoxy groups to phenol groups. Heating is then conducted at a temperature of about 50° C. to about 150° C. to distilled off methyl acetate and the decomposition products of the quaternary ammonium hydroxide. The first stage of hydrolysis stage of the reaction is usually conducted under reflux condition. However, the first and second stages can be conducted concomitantly wherein methyl acetate is removed as soon as it is generated. The removal of methyl acetate facilitates the hydrolysis reaction since its removal shifts the hydrolysis to the phenol side of the equilibrium reaction.

Quaternary ammonium hydroxides are noted for their instability to heat. This instability is useful in this invention since, after the hydrolysis reaction, heat can be used to decompose the quaternary ammonium hydroxide to its low-boiling decomposition products which can readily be removed from the reaction solution.

After removal of the methyl acetate and quaternary ammonium decomposition products, the 4-hydroxystyrene polymer can be used per se as its solution or the polymer can be recovered as a solid either by removal of all solvents by vacuum distillation or by precipitating the polymer from the solution.

The process of this invention is described in more detail in the following examples. All parts and percentages are by weight unless otherwise indicated.

EXAMPLE 1

To a suitable reactor equipped with a dropping funnel are added 747 parts of ethylene glycol monopropyl ether. To the dropping funnel are added 270 parts of styrene, 850.5 parts of 4-acetoxystyrene, 40.3 parts of ethyl-3,3-di(t-amylperoxy)butrate at 75 percent solids in mineral spirits and 33.6 parts of n-octadecyl mercaptan. A nitrogen sparge is introduced into the reactor and heat is applied raising the temperature to 145° C. The monomer-catalyst solution is slowly added over a two hour period with the temperature being held at reflux (140° C.–148° C.). After the addition of the monomer-catalyst solution is completed, the temperature is held at 147° C. for one hour. Additional catalyst, 4.5 parts is then added. Heating at 145° C.–146° C. is continued for two hours. The resulting polymer solution has a solids content of 58.5 percent and a Gardner-Holdt viscosity at 25° C. of $Z_1$-$Z_2$.

EXAMPLE 2

To a suitable reactor are added 973 parts of the polymer solution of Example 1 and 50 parts of ethylene glycol monopropyl ether. After adding 372.7 parts of methanol, the temperature is raised to 35° C. and 59.8 parts of a 20 percent solution of tetramethylammonium hydroxide in methanol are added. The temperature immediately rises to 41° C. and the temperature is held at 40° C. for 3 hours and 55 minutes. Methanol, 100 parts, is then added and the temperature is raised to 50° C. and then is held at 43° C. for 45 minutes. Additional tetramethylammonium hydroxide, 29.9 parts as a 20 percent solution in methanol, is added. The temperature is held at 40° C. for 5 hours and 45 minutes. Methanol, 200 parts, is then added and heating is continued for eight hours at 40° C. Tetramethylammonium hydroxide, 29.9 parts as a 20 percent solution in methanol, is then added and the temperature is held for 2 hours at 43° C. Additional methanol, 100 parts is added, and heating is continued for 4 hours and 45 minutes at 43° C. The temperature is then raised to the reflux temperature and is held at reflux for 2 hours. Solvents are then removed by distillation to a temperature of 102° C. and to a solids content of 60 percent. The resulting vinylphenol copolymer has a weight per phenolic hydroxyl of 218 which indicates a hydrolysis of about 88 percent. The nitrogen content is 0.07 percent.

EXAMPLE 3

To a suitable reactor are added 100 parts of a solution, at 59 percent solids, of poly-p-acetoxystyrene in the monopropyl ether of ethylene glycol and 36.1 parts of 1 molar tetrabutylammonium hydroxide in methanol. Heat is applied raising the temperature to 68° C. the reflux temperature. This temperature is held for 3 hours and 25 minutes. The temperature is then lowered to 35° C. and 13 parts of 1 molar tetrabutylammonium hydroxide in methanol are added. The temperature is raised to 68° C. followed by cooling to 35° C. A portion of the volatiles (methylacetate, methanol and tetrabutyl ammonium hydroxide decomposition products) is removed by heating the reactants to 82° C. After 30 minutes at this temperature, 5 parts of 1 molar tetrabutylammonium hydroxide in methanol are added. The reactants are heated to reflux and are held at reflux for 5.5 hours. The reactor is then fitted with a distillation column and heat is applied, raising the temperature to 158° C. to remove solvents and volatiles. The polymer is then redissolved in the monopropyl ether of ethylene glycol. The acetate groups of the polymer are 95 plus percent hydrolyzed as indicated by infrared analysis.

EXAMPLE 4

To a suitable reactor equipped with a Vigreux column and a Claisen vapor condenser with trap plus a dropping funnel are added 1057.5 parts of a solution of poly-p-acetoxystyrene, at 57 percent solids in the monopropyl ether of ethylene glycol, and 384.32 parts of methanol. To the dropping funnel are added 76.05 parts of a 20 percent solution of tetramethyl ammonium hydroxide in methanol. The temperature in the flask is heated to 74° C. and the tetramethylammonium hydroxide solution is added over a 4 hour period. A small amount of distillate is constantly removed to keep the temperature at 70° C. After 3 hours and 45 minutes, 158.8 parts of distillate are removed. The reactants are then heated to 150° C. over a 4 hour period to remove methanol, methylacetate and tetramethylammonium hydroxide decomposition products. 863.3 parts of polymer solution at 60.32 percent solids are recovered. The poly-p-vinylphenol has a weight per phenolic hydroxyl of 151.6 as determined by UV analysis, which indicates a percent hydrolysis of about 85.6. The residual nitrogen content is 0.3 percent and the residual ash content is less than 0.1 percent.

The polymers and copolymers of p-vinylphenol obtained by the process of this invention are used to make compositions useful in the treatment of metal surfaces to impart corrosion resistance and paint adhesion characteristics to the metals as described in U.S. Pat. No. 4,333,015, which is hereby incorporated by reference.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. A process which comprises:
   a. reacting a polymer of 4-acetoxystyrene dissolved in methanol with a quaternary ammonium hydroxide at a temperature of about 40° C. to about 80° C. for a time sufficient to hydrolyze the acetoxy groups to phenol groups; and
   b. heating at a temperature of about 50° C. to about 150° C. to distill off the methyl acetate formed in the reaction and the decomposition products of the quaternary ammonium hydroxide.

2. The process of claim 1 wherein about 0.05 to about 1 mole of quaternary ammonium hydroxide is present per mole of acetoxy groups.

3. The process of claim 1 wherein about 0.1 to about 0.2 mole of quaternary ammonium hydroxide is percent per mole of acetoxy groups.

4. The process of claim 1 wherein at least 4 molar excess of methanol is present over that required for the methanolysis reaction.

5. The process of claim 1 wherein the quaternary ammonium hydroxide is tetramethylammonium hydroxide.

6. The process of claim 1 wherein the polymer of 4-acetoxystyrene is a homopolymer.

7. The process of claim 1 wherein the polymer of 4-acetoxystyrene is a copolymer.

8. The process of claim 7 wherein the copolymer is a copolymer of 4-acetoxystyrene and styrene.

* * * * *